Jan. 17, 1939.   P. C. KEITH, JR   2,143,949
TREATMENT OF HYDROCARBON OIL
Filed July 7, 1936
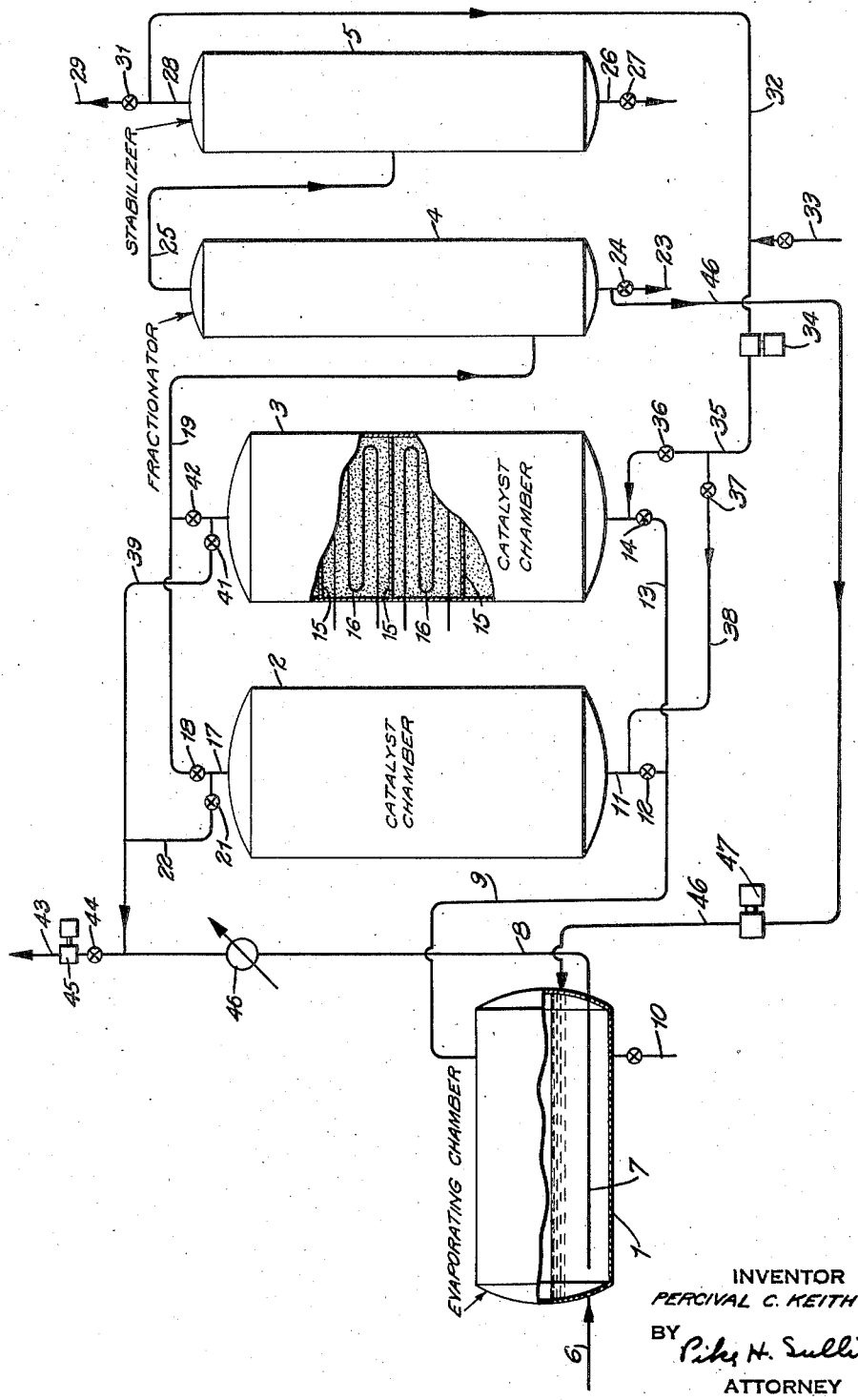
INVENTOR
PERCIVAL C. KEITH JR.
BY
*Pike H. Sullivan*
ATTORNEY Patented Jan. 17, 1939

2,143,949

UNITED STATES PATENT OFFICE 2,143,949

TREATMENT OF HYDROCARBON OIL

Percival C. Keith, Jr., Peapack, N. J., assignor to Process Management Company, Inc., New York, N. Y., a corporation of Delaware Application July 7, 1936, Serial No. 89,278

3 Claims. (Cl. 196—52)

This invention relates in general to the conversion of higher boiling hydrocarbon oils into lower boiling ones and more especially to the catalytic conversion of relatively heavy hydrocarbon oil into hydrocarbons within the gasoline boiling point range and of high anti-knock rating.

This invention relates more particularly to a process wherein hydrocarbon vapors resulting from the vaporization of relatively heavy oil are contacted with a solid adsorbent material having a catalytic effect thereon for the purpose of converting these vapors into lower boiling hydrocarbons oils including gasoline constituents of high anti-knock rating.

An object of the invention is to provide an improved catalytic process of the character indicated wherein products of combustion resulting from the regeneration of used catalytic adsorbent material are utilized as a vaporizing medium for the charging oil.

Another object of the invention is to provide an improved method of regenerating the spent catalytic adsorbent material with the aid of fixed gases produced in the system without the necessity of removing the catalytic material from the apparatus in which the treatment of the hydrocarbon vapors is effected.

This invention has for further objects such additional improvements in operating advantages and results as may hereinafter be found to obtain.

According to the invention, relatively heavy hydrocarbon oil, preferably heated to elevated temperature in any suitable manner whereby the desired degree of vaporization of the oil is obtained without coke difficulties, is introduced into an evaporating chamber and therein intimately contacted with products of combustion and fixed gases resulting from the regeneration of spent catalyst which had been used in the process. These products of combustion and fixed gases, hereinafter referred to as products of regeneration, are at an elevated temperature and, due to the intimate dispersing thereof through the body of relatively heavy hydrocarbon oil, the desired degree of vaporization thereof is effected. The vapors thus liberated and the products of regeneration utilized as the vaporizing medium and the carrier for the vapors through the system are passed through a bed or layers of, or otherwise intimately contacted with, a natural occurring or activated adsorbent clay material such as, for example, fullers' earth, bentonite, bauxite, clay from Death Valley in California, or other adsorbent earths or clays, having the effect of catalytically converting the higher boiling hydrocarbon vapors into lower boiling ones. The products of conversion resulting from the catalytic treatment are suitably separated into fixed gas, gasoline, and hydrocarbon oil heavier than gasoline, in the nature of gas oil, the fixed gas including the products of combustion utilized as vaporizing medium. Part of the fixed gas thus obtained is employed as an aid in regenerating spent catalysts, products of regeneration therefrom being used as aforementioned as the vaporizing medium as well as the carrier of the vapors through the system.

When adsorbent clays of the character recited above are thus employed, their effectiveness becomes somewhat reduced during the course of treatment and various expedients have been employed for regenerating or renewing the activity of the clay for further use. According to this invention, such regeneration is effected in situ by discontinuing the flow of hydrocarbon vapors through one of the chambers containing the adsorbent material after the adsorbent material has become spent, and passing fixed gas produced in the process and admixed with controlled amounts of an oxygen-containing gas, such as air, or relatively pure oxygen through the bed or layers of adsorbent material to burn all or substantially all of the carbon and polymers adsorbed by the clay or present therein.

In order that the invention may be clearly set forth and understood, there is described, with reference to the drawing accompanying and forming part of this specification, various preferred manners in which the invention may be practiced and utilized.

In the drawing, the single figure is a more or less diagrammatic elevational view, partly in section, of an apparatus capable of carrying out the invention.

Referring to the drawing, the main parts of the apparatus capable of carrying out the invention may comprise an evaporating chamber 1, catalyst chambers 2 and 3, a fractionating tower 4, and a stabilizer 5. Relatively heavy hydrocarbon oil, such as reduced crude or heavy virgin gas oil, is suitably preheated to a temperature of between about 500° and 800° F. and passed through a line 6 into the evaporating chamber 1. The degree of preheating the relatively heavy hydrocarbon oil depends upon the type of oil being used, the heating being carried out to such an extent that maximum vaporization thereof may be effected without detrimental coke deposition. A body of thus preheated oil is maintained in the chamber 1, the part thereof passing off as vapors being continuously replenished by freshly preheated oil introduced through line 6. Heavy tarry-like material collected in the lower portion of the evaporating chamber 1 may be withdrawn therefrom through a line 10 to prevent the accumulation of excessive tarry-like material within the chamber.

A suitable nozzle or dispersing pipe 7 is disposed within the evaporating chamber 1 below the level of oil therein. This pipe 7, which is provided with a plurality of perforations, is connected to line 8 through which a suitably heated vaporizing medium is introduced into the body of oil to effect vaporization thereof. In accordance with this invention, the vaporizing medium may comprise hot products of regeneration obtained from the regeneration of the adsorbent material in one or more of the catalytic chambers, as will be hereinafter explained.

Hydrocarbon vapors evolved from the oil in the evaporating chamber 1 pass overhead therefrom through a line 9 to a selected catalytic chamber or chambers wherein the hydrocarbon vapors are catalytically converted to lower boiling hydrocarbons containing motor fuel of high anti-knock value. The invention will be described in connection with using one catalytic chamber for conversion purposes while simultaneously regenerating the catalyst in the other chamber, although it will be understood that two or more chambers, in series or parallel, may be used for the conversion of the hydrocarbon material while a like number of chambers similarly connected are being subjected to the regeneration operation. Moreover, spare chambers may be provided to insure continuous operation in case one or more of the chambers needs repairs or the like.

The invention will be described with reference to using catalyst chamber 2 for the conversion of hydrocarbon vapors while regenerating the spent catalysts in chamber 3. The hydrocarbon vapors passing through line 9 are conducted to chamber 2 through line 11, having valve 12, valve 14 in line 13 being closed to prevent hydrocarbon vapors from entering chamber 3 which is, in accordance with the description, being subjected to the regeneration operation. While the flow of hydrocarbon vapors in the chamber 2 has been shown as upwardly, it is to be understood that the vapors may be passed downwardly therethrough.

Each of the catalytic chambers, chamber 3 being used for illustrative purposes, is provided with a plurality of trays 15 suitably spaced from each other. The adsorbent catalytic material of the character mentioned, prepared in any suitable manner and containing, if desired, catalytic metals, such as nickel or the like, finely dispersed therethrough, is placed upon each of the trays and preferably fills the space between adjacent trays although the entire space between does not necessarily have to be completely filled. A cooling coil 16 is embedded in the adsorbent material between each of the trays for the purpose of controlling the temperature of the catalytic mass during regeneration thereof. If the space is not completely filled, such cooling coils may be positioned above the catalytic mass. Any suitable method of cooling the catalytic mass may be used.

Hydrocarbon vapors entering catalyst chamber 2 are therein intimately contacted with the adsorbent material to effect catalytic conversion of the relatively heavy high boiling hydrocarbon oils into lower boiling ones including motor fuel of high anti-knock value. A high conversion of the hydrocarbon vapors in passing once through the catalytic chamber is effected due to the catalytic action of the adsorbent clay. Products of conversion leaving chamber 2 pass through line 17, having valve 18, to line 19 connected to the fractionating tower 4, valve 21 in line 22 being closed for reasons hereinafter appearing.

Vaporous hydrocarbon materials entering the fractionator 4 are therein fractionated to separate hydrocarbon oil heavier than gasoline, in the nature of gas oil, from the gasoline constituents and lighter. Suitable refluxing within the tower 4 may be employed to effect the desired separation in a manner well understood. The hydrocarbon oil heavier than gasoline is withdrawn from the fractionating tower 4 through a line 23, having a valve 24, and passed to suitable storage, not shown. This hydrocarbon oil is admirably suited for pyrolytic cracking and may, if desired, be so processed. Part or all of this oil may be recycled through line 46 provided with pump 47 to the evaporating chamber 1 for reprocessing in the same cycle.

Vaporous hydrocarbons containing gasoline constituents and lighter pass from the fractionating tower 4 through a line 25 to the stabilizer 5 wherein the gasoline components are condensed and stabilized. Suitable bottom heating means and top cooling means, as well as suitable refluxing at the top of the stabilizer, may be used, as is well understood. Stabilization of the gasoline may be effected at atmospheric pressure although, if desired, a pressure between 100 and 400 pounds per square inch may be maintained on the stabilizer 5 by interposing a suitable pump in line 25. Stabilized gasoline of high anti-knock value is withdrawn from the stabilizer 5 through a line 26, having a valve 27, and passed to suitable storage, not shown. Fixed gas, resulting from the conversion of the hydrocarbon oil, and products of combustion, utilized as the vaporizing medium as well as the carrier for the hydrocarbon vapors, are withdrawn from the stabilizer 5 through line 28 and part of these materials may be vented from the system through line 29, having a valve 31.

In accordance with this process, the remaining portion of the fixed gas and products of combustion passes through line 32 and is utilized to aid in the regeneration of the adsorbent material which has become spent during the conversion of the hydrocarbon vapors. In carrying out the regeneration of the spent adsorbent material, a controlled quantity of an oxygen-containing gas, such as air, or relatively pure oxygen is mixed with the material passing through line 32 prior to the passage thereof through the spent catalytic material. As shown, the oxygen-containing gas or relatively pure oxygen is introduced into the line 32 through a line 33. The resulting mixture is then forced by a suitable pump or blower 34 through line 35, having a valve 36, into the catalytic chamber 3. Valve 37 in line 38 is closed to prevent the mixture from entering catalyst chamber 2 which, in accordance with the description, is being used as the zone in which the hydrocarbon vapor is being catalytically converted. If desired, the mixture may enter the top of the chamber for downflow instead of as shown.

The mixture of fixed gas and oxygen enters the catalytic chamber 3, which is at an elevated temperature, and the oxygen present therein burns off the carbon or other material, such as heavy polymers, from the adsorbent clay and may effect partial combustion of the fixed gas in the chamber 3. In regenerating the adsorbent clay in this manner, it is generally preferred to maintain the chamber 3 at a temperature of from about 1000° to 1100° F. or higher, care being taken not to sinter the adsorbent material. The coils 16 embedded in the catalytic bed or layers may be used to control the temperature of regeneration, this control being accomplished by passing any suitable cooling fluid, such as water, steam, oil, diphenyl, or the like, through the coils 16. The fixed gas passing through the catalytic mass may also function to cool it, that is, control the temperature of regeneration, as well as function as a carrier for the oxygen and products of combustion from the catalytic chamber 3. Products of regeneration resulting from combustion within the catalytic chamber 3 passes therefrom through line 39, having valve 41, valve 42 being closed to prevent them from entering line 19 and passing to fractionator 4. Part of the products of regeneration passing through the line 39 may be vented from the system through line 43, having valve 44. The portion thus vented may be passed through a suitable work engine 45 to recover the available heat energy therefrom and convert it into usable power. Similarly, the material leaving the system through line 29 may be passed through a suitable work engine, not shown.

The remaining portion of the products of regeneration are conducted through line 8 and cooler 46, wherein they are suitably cooled, to the dispersing pipe 7 as a vaporizing medium for the heavy hydrocarbon oil. Sufficient pressure is maintained on the products passing through the regeneration cycle by the pump or blower 34 to force the liberated hydrocarbon vapors through the apparatus, it being generally preferred to have only sufficient pressure to accomplish this purpose. If the stabilizer 5 is maintained under superatmospheric pressure, as before mentioned, the pump or blower 34 may be dispensed with and the pressure on the stabilizer utilized to force the material through the system.

As an example of an operation conducted in accordance with this invention, a 40% East Texas bottoms, that is a crude from which about 60% has been distilled off, heated to a temperature of between 500° and 800° F. in any suitable manner, is introduced into the evaporating chamber 1. Hot products of combustion at a temperature of about 900° to 1050° F. are continuously introduced into the chamber 1 through the dispersing pipe 7 to effect the desired degree of vaporization of the relatively heavy hydrocarbon oil contained therein. The liberated hydrocarbon vapors in passing through the catalyst chamber are therein catalytically converted in one passage to the extent of 50% or more into gasoline constituents having an anti-knock rating of 75 or more as determined by the motor method.

While control of temperature of the catalyst during regeneration may be satisfactorily regulated by passing a suitable cooling fluid through the coils 16, this control may also be effected by regulating the oxygen content of the regenerating gas mixture passing through the line 35. For instance more or less fixed gas produced from the cracking operation and passing through line 32 may be admixed with the oxygen or oxygen containing gas introduced through line 33. By controlling the oxygen content of the regenerating gas mixture the temperature in the catalyst chamber may be regulated in that the fixed gas present in the regenerating gas mixture will absorb heat liberated during regeneration, thereby preventing the temperature from becoming excessive.

From the foregoing it will be evident that this invention provides a process wherein products of regeneration recovered from the regeneration of spent catalysts, are utilized to effect the desired vaporization of and act as a carrier for the hydrocarbon oils being converted into more desirable products.

It will be readily understood by those skilled in the art that while the invention has been illustrated and described with respect to a preferred operation, and with reference to apparatus of more or less conventional design, the invention is not limited to such exemplifications but may variously be practiced and embodied within the scope of the claims hereinafter made.

I claim:

1. In a process for the conversion of higher-boiling hydrocarbons into lower-boiling hydrocarbons wherein said higher-boiling hydrocarbons are passed at elevated temperature through a body of finely divided adsorbent catalytic clay material capable of promoting the desired conversion in a catalytic conversion zone to effect conversion of said hydrocarbons by contact with said catalytic material with accompanying deposition of carbonaceous material on said catalytic material, the steps comprising discontinuing passage of said higher-boiling hydrocarbons through said body of catalytic material, passing oxygen-containing gas through said body of catalytic material to burn therefrom said carbonaceous deposits with accompanying production of hot combustion gases, maintaining externally of a conversion zone a body of higher-boiling hydrocarbon oil at elevated temperature, passing at least a portion of said hot combustion gas through said heated body of oil to promote vaporization of a portion thereof and heating of the resulting vapors to a temperature sufficiently high to effect the desired conversion thereof in contact with said catalytic material, and passing the resulting mixture of higher-boiling hydrocarbon oil vapors and combustion gas free from liquid constituents through a second body of said catalytic material to effect conversion of higher-boiling constituents thereof to lower-boiling hydrocarbons.

2. A method in accordance with claim 1 wherein a preheated residual o' containing vaporizable higher-boiling hydrocarbons is continuously introduced into said body of heated oil, and residual constituents unvaporizable under the conditions maintained in said body are continuously withdrawn therefrom.

3. The method in accordance with claim 1 wherein said heated body of oil is maintained by the introduction thereto of residual oil containing vaporizable high-boiling constituents, the conversion products from said conversion reactions are fractionated to separate therefrom constituents higher boiling than gasoline and said higher boiling constituents are introduced into said heated body of oil, and residual constituents unvaporizable under the conditions maintained in said heated body of oil are continuously withdrawn therefrom.

PERCIVAL C. KEITH, Jr.